Nov. 7, 1961 C. C. DAVIS ET AL 3,007,618
HOLDING DEVICES
Filed Jan. 2, 1959
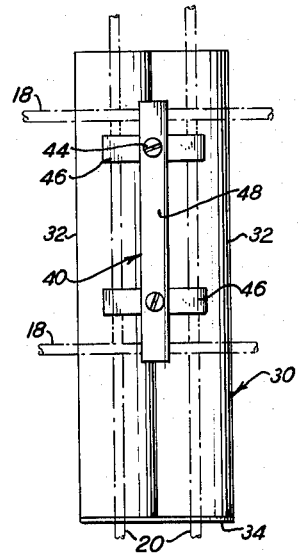
Fig.1
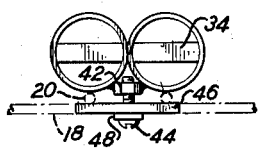
Fig.2
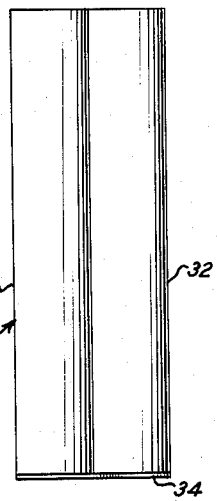
Fig.3
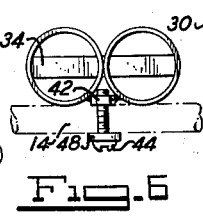
Fig.6
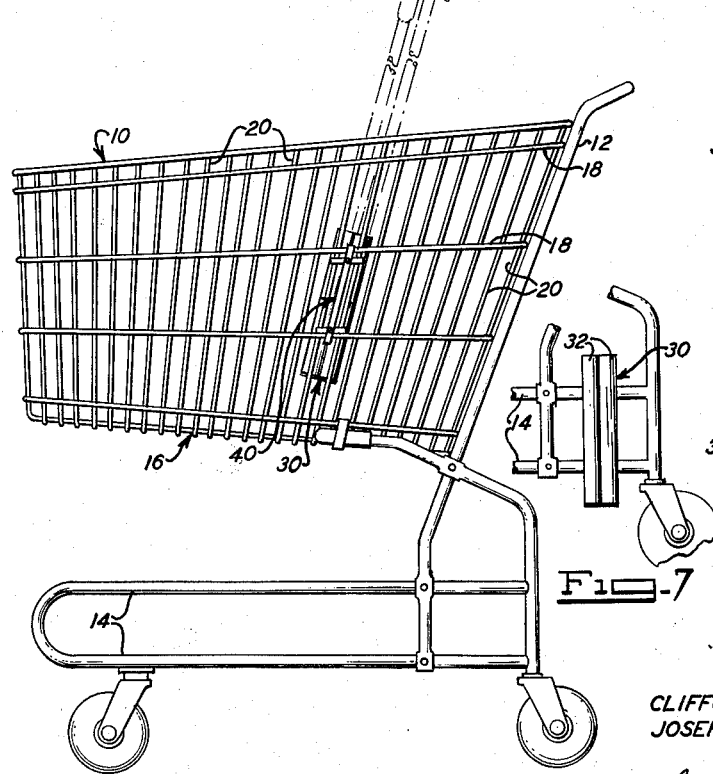
Fig.5
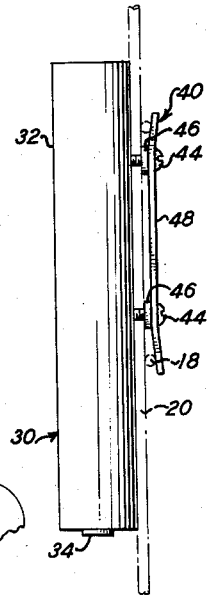
Fig.7
Fig.4
INVENTORS
CLIFFORD C. DAVIS
JOSEPH M. SMITH
BY Sweeker + Mathis
ATTORNEYS

United States Patent Office

3,007,618
Patented Nov. 7, 1961

3,007,618
HOLDING DEVICES
Clifford C. Davis, Highland Drive, and Joseph M. Smith, Knollwood Drive, both of Morristown, Tenn.
Filed Jan. 2, 1959, Ser. No. 784,780
4 Claims. (Cl. 224—42.45)

This invention relates to holding devices for brooms, mops, dustmops, wax appliers, and the like, which holding devices can be attached to shopping carts such as those used in supermarkets and variety stores.

At the present time, it is customary to sell many types of products in self-service retail stores. This method of merchandising has been particularly successful in connection with the sale of food items and household goods. In a typical super market, the customer pushes a wheeled shopping cart along aisles, chooses the items he desires from the shelves, places the items in the cart, and then proceeds to a check out counter where he pays for them.

One difficulty in this operation arises when the customer wishes to buy a broom, mop, dustmop, wax applier or similar item which has a relatively long handle. Because of their long handles, these items do not fit into the ordinary shopping carts. The customer then finds it necessary to lay the item across the cart or carry it in his hand. This is troublesome and awkward.

One object of this invention is to provide a holding device for brooms, mops, dustmops, wax appliers and the like so that these items may be easily transported without inconvenience to the customer from wherever they are displayed in the store to the check out counter.

Another object of this invention is to provide a holding device of this type which can be readily attached to or removed from a shopping cart of the type ordinarily used in supermarkets and the like.

A further object of this invention is to provide a holding device for brooms and similar articles having long handles which will allow the handles to be easily inserted and removed from the holding device.

Another object of this invention is to provide a holding device for supporting brooms and like articles in an upright position with sufficient support means to retain the articles in such a position.

These objects may be accomplished, according to one embodiment of the invention, by providing a holding device having a container member and a fastening assembly for mounting the container member on a shopping cart.

The container member has at least one opening therein of suitable length and diameter to receive and support an end portion of the handle of a broom or similar article. It is preferred that the broom be held in a generally vertical position. With this arrangement, the end portion of the broom remote from the holding device will not protrude laterally a substantial distance from the shopping cart, and there is little danger that the broom will interfere in any way with the ordinary use of the cart. The cart can be moved freely along the aisles of merchandise without fear that a protruding end of the broom will strike against the stacked articles which line the aisles.

In order to assure that the broom will be held in the desired vertical position, the holding device preferably is of significant length and is provided with a stop element at its lower end. The end of the broom rests upon the stop element and is supported against tilting movements by contact with other portions of the device located above the stop element.

The fastening assembly preferably serves to secure the container member to the wire basket of the shopping cart, and its construction may be such that elements of the assembly cooperate with the wires of the basket to prevent tilting of the holding device under the influence of the loads applied thereto. If desirable, the fastening assembly may serve alternatively to attach the container member to certain frame members of the shopping cart. The holding device may be secured to a cart in such a manner as to offer no obstruction to the stacking of a plurality of the carts in the usual way.

This embodiment of the invention is illustrated in the accompanying drawings in which:

FIG. 1 is a side elevation view showing a holding device (full lines) fastened to a wire basket (broken lines) of a shopping cart, in accordance with the present invention;

FIG. 2 is a plan view showing the holding device in full lines and the wire basket in broken lines;

FIG. 3 is a side elevation view of the holding device taken from the side opposite that shown in FIG. 1;

FIG. 4 is an end elevation view showing the holding device in full lines and the wire basket in broken lines;

FIG. 5 is a side elevation view showing a broom and mop (broken lines) carried by the holding device attached to a shopping cart;

FIG. 6 is a plan view showing a holding device (full lines) fastened to a side frame member (broken lines) of a shopping cart; and FIG. 7 is a side elevation view corresponding to FIG. 6, showing the holding device attached to parallel frame members at the rear of a shopping cart.

The preferred embodiment of the invention is used with a well known type of shopping cart designated generally by the numeral 10 in FIG. 5. The cart 10 includes a suitable frame portion 12 having a handle by which the cart may be pushed about, a wire basket 16, and parallel lower frame members 14 located beneath the wire basket 16. There are two sets of parallel lower frame members 14, one set on each side of the shopping cart 10. These two sets of parallel lower frame members 14, together with suitable cross frame members (not illustrated) form a carrying platform in addition to the carrying space provided by the wire basket 16.

The wire basket 16 of the shopping cart 10 illustrated in the drawings may be formed of horizontal wires 18 and vertical wires 20 of appropriate gauge which are bent and retained in position in a suitable manner so as to provide a receptacle for various items. Such baskets are commonly used on shopping carts. However, this type of basket is not suitable for carrying long handled items such as brooms, mops, dustmops, wax appliers and the like. These items, because of their handles, are much longer than the longest dimension of the usual basket.

In order that long handled items such as those referred to may be carried in the usual shopping cart, the present invention contemplates the provision of a holding device 30 particularly suitable for use with the wire basket 16 or with the frame members 14 of the shopping cart.

The preferred embodiment of this holding device, which is illustrated in the drawings, comprises a container member which may be formed of tube-shaped members 32 placed side by side and secured together by welding or other suitable means. The inside diameter of a tube 32 should be large enough to receive easily a broom handle, for example, and each tube 32 should be long enough so that a broom handle will extend a substantial distance into the tube and be supported thereby. A suitable tube might have a diameter of one and one-half inches and a length of nine inches. Other dimensions obviously might be found to be appropriate. A tube having a length approximately six times its diameter will provide two suitably spaced apart support points for a broom, one at the bottom of the tube and the other at the top. This will prevent the broom from tipping or swinging from an upright position.

The tubes 32 may be made of steel, aluminum, plastic or any other suitable material. While two tubes 32 have been illustrated in the drawings, it will be evident that the container member may be formed of several tubes. For example, three tubes or four tubes, or more, could be placed side by side in a line and suitably secured together, or four tubes could be placed so as to form a square in which each tube could be secured to two other tubes. However, it should be noted that the use of two tubes 32, as illustrated, provides a balancing feature for the fastening assembly, as will be described hereinafter.

In order to close off the bottoms of the tubes 32 so that the handles of brooms or other similar articles will not slide through the tubes, a bar or plate 34 may be fixed to the bottoms of the tubes. It is also possible that the bottom of each tube may be crimped to serve this purpose.

A fastening assembly 40 secures the tubes 32 of the holding device 30 to the strands 18 and 20 of the wire basket 16 or to the frame members 14. This fastening assembly secures the holding device in a somewhat vertical position so that the open ends of the tubes 32 face upwardly. A broom, for example, may be lifted above the shopping cart and its handle easily lowered into one of the tubes 32. The bar 34 will prevent the handle from sliding through the lower end of the tubes.

A retaining means for the fastening assembly 40 includes internally threaded elements such as nuts 42, spaced from each other along the tubes, and welded or otherwise fixed to the tubes 32 so that their threaded openings face outwardly from the sides of the tubes. The retaining means also includes externally threaded elements such as bolts 44 received in the nuts 42.

Loosely pivoted on each bolt 44 is a short bar member 46 having a hole therethrough larger than the diameter of the bolt 44. A long bar member 48 extends along the tubes 32 and has two holes therein through which bolts 44 extend. The long bar member 48 is located between the short bar member 46 and the head of the bolt 44.

It should be pointed out that in the illustrated basket 16 the horizontal strands of wire 18 are placed outside the vertical strands of wire 20. For this reason, when the holding device is to be placed inside the basket, the long bar 48 is placed outside the short bars 46. Should the holding device 30 be used with a wire basket having the horizontal strands of wire inside the vertical strands of wire, then the long bars 48 could be placed inside the short bars 46.

Obviously, the holding device could be placed either inside or outside the basket or on any one of the four sides of the basket. When the holding device is used on shopping carts which can be stacked, that is the baskets can be pushed inside one another because of a pivoting rear side, it will be desirable to take this fact into consideration when locating the holding device on the cart.

To place the holding device on a wire basket of a shopping cart, the bolts 44 are loosened to allow a substantial clearance between the short bar members 46 and their respective nuts 42. The short bar members may then pivot freely about the bolts 44. The short bars are rotated to extend approximately along the long bar member 48. The holding device is then placed adjacent the side of the basket and the short and long bar members are inserted through the opening between strands 18 and 20. To accomplish this, it might be necessary to apply a slight twist to the holding device so that the long bar member 48 will fit through the opening.

When the short and long bar members 46 and 48 are through the opening, the holding device can be adjusted so that the long bar 48 contacts two horizontal strands 18. Next, the short bars 46 can be rotated so that each bar contacts two vertical strands 20. Then bolts 44 are tightened to grip the strand between the tubes 32 and the short and long bar members 46 and 48. This securely clamps the holding device to the basket.

The use of two tubes 32 together with the long and short bar members provides a balanced fastening arrangement. Two adjaecnt vertical strands 20 are contacted by the two spaced apart short bar members 46 and are firmly drawn against the two tubes 32 so that each strand runs along the length of a tube. This arrangement prevents the holding device from tilting or pivoting after the bolts 44 are tightened.

It may be found desirous to place the holding device on the frame of the shopping cart rather than on the basket. While the holding device can be placed on the basket so as not to interfere with stacking of the shopping carts, for example, on the outside and to the rear of the basket, also the holding device can be placed on the frame of the shopping cart in a manner which will not interfere with stacking of the carts.

The shopping cart 10 illustrated in the drawings has two sets of parallel lower frame members 14. The holding device may be placed on these frame members or on any similar frame members if the shopping cart which is to be provided with the holding device has a different frame arrangement.

To place the holding device on parallel frame members 14 of a shopping cart, the bolts 44 are loosened to allow a substantial clearance between the long bar 48 and the nuts 42. The holding device is then placed adjacent the frame members 14 and twisted slightly to let the frame members slide between the long bar 48 and the tubes 32. Then the bolts 44 are tightened to grip the frame members 14 between the long bar 48 and tubes 32.

It is possible when attaching the holding device either to a shopping cart basket or to shopping cart frame members, to first loosen the bolts 44 so that they separate from the nuts 42, and next to fit together the parts of the fastening assembly around the strands of the wire basket or frame members, and then to insert and tighten the bolts 44 in the nuts 42.

It is readily apparent that this holding device is easily and inexpensively manufactured. It may be attached to or removed from the type of shopping carts which are generally used in supermarkets and variety stores without altering the structure of the shopping carts. It provides a convenient way for customers to transport such long handled items as brooms, mops, dustmops, wax appliers and the like from the place at which they are displayed to the check out counter. The long handled articles can be easily inserted into or taken out of the holding device because of the use of the tube structure and the article is given a positive support in an upright position to hold it conveniently out of the way.

While the invention has been illustrated and described in a certain preferred embodiment, it is recognized that variations and changes may be made therein without departing from the invention as set forth in the claims.

We claim:

1. A holding device comprising a container member having holes therein adapted to snugly receive and retain the end portion of a broom handle, and a fastening assembly connected to the container member and adapted to fasten the container member to a shopping cart which includes a basket having sides of spaced apart wire members, said fastening assembly comprising spaced apart adjustable retaining means, short bars pivotally mounted about said retaining means, and a long bar extending between said retaining means and having holes therein through which said retaining means pass, said short bars being pivotal about said retaining means so that adjacent wire members may be positioned between the short and long bars and the container member after which the retaining means may be adjusted.

2. A holding device comprising a pair of tubes rigidly secured together in side-by-side relation, each of said tubes being of sufficient length and having an inside diameter slightly larger than a broom handle to receive a considerable portion of a broom handle, means closing adjacent ends of each tube to form stops against which broom handles inserted into the opposite ends of said tubes may rest, and a fastening assembly adapted to fasten the tubes to a cart having a wire basket, said fastening assembly comprising a pair of nut means spaced along and secured to said tubes, bolt means for each nut means extending normally from the tubes, a pair of short bars each having a hole therein through which one of said bolt means extends, and a long bar having holes therein through which each bolt means extends, said bolt means adapted to be threaded into said nut means for clamping the sides of the wire basket between the short and long bar means and the tubes.

3. A holding device comprising a pair of tubes rigidly secured together in side-by-side relation, said tubes normally extending upright and having open tops and closed bottoms and being of sufficient length and inside diameter to receive therein and support a broom handle, and a fastening assembly adapted to fasten the tubes to a basket having spaced apart, generally vertically extending wire members and spaced apart, generally horizontally extending wire members, said fastening assembly comprising a pair of nut means spaced along and secured to said tubes, bolt means for each nut means, a pair of short bars each having a hole therein through which one of said bolt means extends, and a long bar having holes therein through which each bolt means extends, said bolt means adapted to be threaded into said nut means whereby adjacent vertically extending wire members are clamped between the short bars and the tubes, and adjacent horizontally extending wire members are clamped between the long bar and the tubes.

4. A holding device comprising holding means adapted to receive and hold a broom handle, said holding means being elongated and extending generally upright, and a fastening assembly adapted to fasten the holding means to a cart having a wire basket of spaced apart, generally vertically extending wire members and spaced apart generally horizontally extending wire members, said fastening assembly comprising a pair of nut means spaced vertically along and secured to the holding means, bolt means for each nut means, a pair of short bars each having a hole therein through which one of said bolt means extends, said short bars being pivotal about the respective bolt means so that the short bars may be fitted between adjacent vertically extending wire members, and a long bar having holes therein through which each bolt means extends, said bolt means adapted to be threaded into said nut means whereby the adjacent vertically extending wire members are clamped between the short bars and the holding means, and adjacent horizontally extending wire members are clamped between the long bar and the holding means.

References Cited in the file of this patent

UNITED STATES PATENTS

| | | |
|---|---|---|
| 361,630 | Husband | Apr. 19, 1887 |
| 2,556,532 | Goldman | June 12, 1951 |
| 2,633,278 | Muniz | Mar. 31, 1953 |
| 2,763,413 | Felton | Sept. 18, 1956 |
| 2,772,934 | Eraut | Dec. 4, 1956 |
| 2,779,560 | Springer | Jan. 29, 1957 |
| 2,856,194 | Dumsha | Oct. 14, 1958 |
| 2,890,583 | Grosskortenhaus | June 16, 1959 |
| 2,902,976 | Wilson | Sept. 8, 1959 |